United States Patent [19]
Brissette et al.

[11] Patent Number: 5,853,177
[45] Date of Patent: Dec. 29, 1998

[54] DRIVE TRANSMISSION SEALING DEVICE

[75] Inventors: Ronald N. Brissette, Lake Orion; Kevin Baldwin, Rochester Hills, both of Mich.

[73] Assignee: Meritor Heavy Vehicle Systems, LLC, Troy, Mich.

[21] Appl. No.: 672,395

[22] Filed: May 28, 1996

[51] Int. Cl.⁶ .................................. F16J 15/32; F16D 3/06
[52] U.S. Cl. ...................... 277/559; 277/565; 277/572; 464/113; 464/133; 464/162
[58] Field of Search ................. 277/8, 182, 189, 277/11, 152; 464/133, 162, 172, 173, 175, 113, 140, 905

[56] References Cited

U.S. PATENT DOCUMENTS

| | | | |
|---|---|---|---|
| 2,198,654 | 4/1940 | Calkins et al. | 464/162 |
| 3,989,259 | 11/1976 | Lorenz et al. | 277/169 |
| 4,131,286 | 12/1978 | Bainard | 277/152 |
| 4,449,717 | 5/1984 | Kitawaki et al. | 277/152 |
| 4,475,373 | 10/1984 | Cook, Jr. et al. | 277/182 |
| 4,475,737 | 10/1984 | Cook et al. | 277/182 |
| 4,575,360 | 3/1986 | Brissette | 464/133 |
| 4,592,556 | 6/1986 | Nieman et al. | 277/27 |
| 4,669,737 | 6/1987 | Diffenderfer | 277/9 |
| 4,767,381 | 8/1988 | Brown et al. | 464/146 |
| 5,230,660 | 7/1993 | Warnke | 464/146 |

Primary Examiner—Randolph A. Reese
Assistant Examiner—John L. Beres

[57] ABSTRACT

A sealing device for a drive line slip yoke includes a generally resilient seal and a substantially rigid cover that cooperate to provide a fluid-tight seal at the interface between a slip yoke and an axially moving splined shaft. The seal has a mounting portion that includes a shoulder received within a groove defined on an outer surface of the slip yoke. The cover is snapped over the seal and maintained in position by cooperating tabs on the cover and a groove defined on an outer surface of the seal. The seal includes a sealing portion having three axially spaced and radially inwardly extending lips. A middle lip acts as an O-ring that serves as a back-up in the event that one of the other two lips becomes damaged or deteriorates with use. The substantially rigid cover serves to maintain the seal in proper engagement with the end of the slip yoke and protects the seal from damage potentially caused by debris encountered during operation. A sealing device designed according to this invention is especially useful in applications that require that lubricant be maintained in the slip yoke over long periods of time and during extensive use.

15 Claims, 1 Drawing Sheet

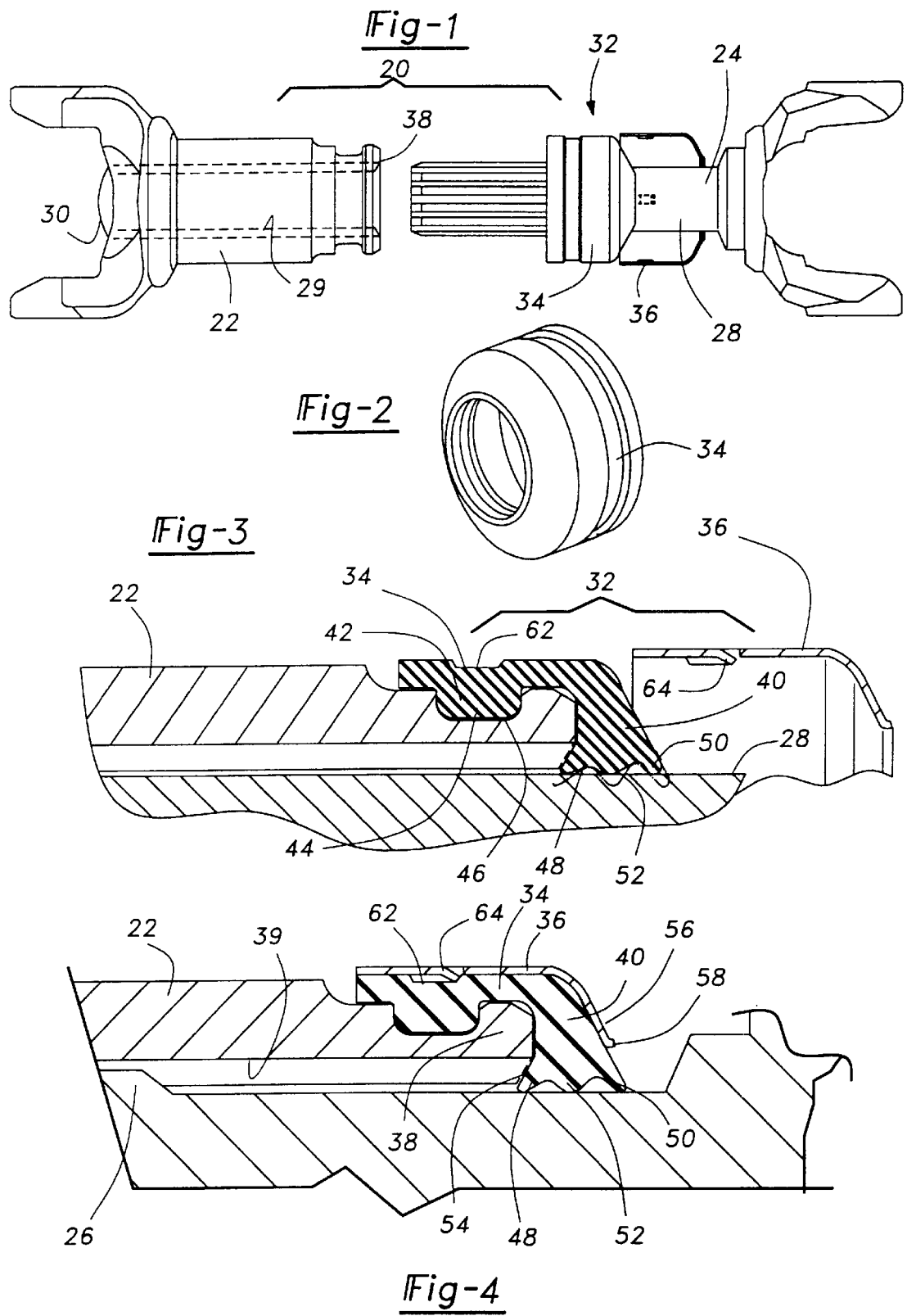

DRIVE TRANSMISSION SEALING DEVICE

BACKGROUND OF THE INVENTION

This invention relates generally to a seal for closing one end of a driveline slip yoke.

Drive trains for use in heavy-duty applications often include a slip yoke connection for connecting a splined shaft to a universal joint. A conventional slip yoke includes a central, longitudinal bore that receives a splined portion on a connection shaft. The splined shaft typically moves axially within the slip yoke bore. Lubricant is provided within the slip yoke bore to facilitate the relative axial movement between the splined shaft and the slip yoke. Each end of the slip yoke bore is preferably sealed to maintain the lubricant within the bore and to prevent undesirable contaminants from entering the bore. One end of the slip yoke bore can be plugged. The other end, however, requires a sealing arrangement that seals the moving splined shaft as it moves axially through the slip yoke bore while a portion of the splined shaft remains outside of the slip yoke.

Conventional slip yoke seals have been threaded onto the end of the slip yoke that receives the splined shaft. Such connections include the drawbacks of increasing manufacturing costs for the seal and slip yoke, and introduce undesirable complexities into the assembly process. Moreover, conventional seals include the possibility of becoming loose with extensive use.

Another problem with conventional seals is that the sealing engagement between the moving shaft and the seal has a tendency to deteriorate with extensive use. Conventional seal arrangements have not included any back-up structure to compensate for a damaged, diminished, or failed sealing surface. Further, conventional seals may be forced out of proper engagement with the slip yoke and moving shaft because the axial movement between the splined shaft and the slip yoke creates large pressure fluctuations within the slip yoke bore. If the seal is not sufficiently maintained on the end of the slip yoke it may be forced out of engagement. Accordingly, in conventional systems, lubricant is sometimes allowed to leak from or be expelled from the slip yoke. The challenge is to provide a sufficient seal that can withstand the rigors of a drive train environment without introducing undue complexity or expense into the assembly.

More recently, the assignee of interest in this application has developed slip yokes designed to perform over extensive periods (i.e., several hundred thousand miles of operation) without requiring any maintenance. Therefore, such systems require that all lubrication in the system be maintained within the slip yoke while keeping all contaminants out of the system. Accordingly, sufficient fluid-tight sealing is required at each end of the slip yoke bore.

This invention provides a driveline sealing device that meets the needs of modern drive line systems and overcomes the shortcomings and drawbacks of the conventional slip yoke seals discussed above.

SUMMARY OF THE INVENTION

In general terms, this invention is a drive transmission that includes a slip yoke having a central bore extending axially through a central portion of the yoke. The slip yoke includes a groove on an outer surface near one end of the slip yoke bore. A shaft is slidably received within the central bore for axial movement relative to the slip yoke. A seal is placed adjacent the one end on the slip yoke to sealingly engage the shaft. The seal has a mounting portion that includes a shoulder received within the groove on the slip yoke. A sealing portion of the seal includes at least two axially spaced lips that sealingly engage the outer surface of the shaft. A substantially rigid cover is received over the mounted portion of the seal for maintaining the seal in proper engagement with the yoke.

In a preferred embodiment, the seal includes three lips at the sealing surface that engages the movable shaft. The three lips are axially spaced with the two outer lips being angled in directions away from each other. The two outer lips provide the primary sealing function while the third, middle lip acts as a back-up in the event that one of the outer lips should become damaged or fail over time. The mounting portion of the seal also preferably includes a groove on the outer surface of the seal. The rigid cover preferably includes a plurality of tabs that are snapped within the groove on the seal such that a firm engagement is maintained between the cover and the seal.

These and other features and advantages of this invention will become apparent to skilled artisans from the following detailed description of the presently preferred embodiment. The drawings that accompany the detailed description can be described as follows:

BRIEF DESCRIPTION OF THE DRAWINGS

FIG. 1 is an exploded, perspective view of selected portions of a drive transmisson designed according to this invention.

FIG. 2 is a perspective view of an inventive seal.

FIG. 3 is a side elevational, partial cross-sectional view of selected portions of the embodiment of FIG. 1.

FIG. 4 is a partial, cross-sectional view of selected portions of FIG. 3.

DETAILED DESCRIPTION OF THE PREFERRED EMBODIMENT

FIG. 1 illustrates a drive transmission 20 that includes a slip yoke 22 and a splined shaft 24. The shaft 24 includes a splined portion 26 and a thin neck portion 28. As can be appreciated from the drawings, the outer diameter of the splined portion 26 is greater than the outer diameter of the neck portion 28. The shaft 24 is received within a central bore 29, which extends axially through the slip yoke 22. The shaft 24 is slidably received within the bore 29 such that the shaft 24 can move axially relative to the slip yoke 22. Accordingly, lubricant preferably is placed within the bore 29 to facilitate the relative axial movement between the shaft 24 and the yoke 22.

A plug arrangement 30, which may be conventional, is provided at one end of the slip yoke 22. A sealing device 32 that includes a seal 34 and a substantially rigid cover 36 is provided at the end 38 of the slip yoke 22. When the shaft 24 is received within the bore 29, the neck portion 28 extends beyond and outside of the end 38 of the slip yoke 22. The sealing device 32 permits the shaft 24 to move axially relative to the slip yoke 22 while maintaining lubricant within the bore 29 and keeping undesirable contaminants from entering the bore 29.

FIG. 2 shows the seal 34 as a cylindrical member.

As best seen in FIG. 3, the sealing device 32 includes a generally resilient seal 34 and a substantially rigid cover 36. The seal 34 is preferably made of a resilient material such as rubber. The cover 36 preferably is substantially rigid and made from a metal material. The seal 34 includes a sealing portion 40 and a mounting portion 42. The mounting portion 42 preferably includes a shoulder 44 that is received within a groove 46, defined on an outer surface of the slip yoke 22 adjacent the end 38. The shoulder 44 and the groove 46 preferably are annular. The mounting portion 42 extends generally axially along a portion of the slip yoke 22 when the sealing device 32 is appropriately positioned on the slip yoke 22.

The sealing portion 40 of the seal 34 includes at least two axially spaced, radially inwardly extending lips 48 and 50. A third lip 52 preferably is positioned between the lips 48 and 50. The lip 52 acts as an O-ring that provides a back-up or extra barrier in the event that one or both of the lips 48 and 50 deteriorate or fail over time. The combination of the three lips 48, 50 and 52 provides a sealing engagement with the outer surface on the neck portion 28 of the shaft 24, which is significantly better than conventional seals.

As can be seen in FIG. 1, seal 34 is initially placed onto the shaft 24, with the inner lips being pulled over the splines 26. In addition, at this time, cover 36 is first placed on the shaft 24.

As shown in FIG. 3, the seal is next engaged with shaft 24 by snapping shoulder 44 into groove 46. At that time, the inner lips 48, 50 and 52 are deformed. The relaxed position of the lips is shown in phantom in FIG. 3. As shown in FIG. 4, it is only after this connection has been made that the cover 36 is then snapped onto the seal 34. As can be seen from FIGS. 1 or 4, the mounting portion or shoulder 44 is formed at a first axial position, and the lips 48, 50 and 52 are formed at an axial position spaced from the axial position of the shoulder 44. Thus, the shoulder 44 may be received within groove 56, and the lips 48, 50 and 52 can extend axially beyond the groove 46, and then radially inwardly to contact the shaft.

As shown in FIG. 4, the lip 48 is preferably angled to match the angle on a chamfer 54 at the end 38 of the bore 39. The chamfered portion 54, therefore, provides support to the lip 48 when the splined plug is stroking inward within the bore 29 (i.e., to the left according to the drawing). The cover 36 preferably includes a ridge 56 that extends generally radially inward and conforms to an outer surface on the sealing portion 40 of the seal 34. The ridge 56 supports the lip 50 when the spline plug 28 is stroking outward through the bore 29 (i.e., to the left according to the drawing).

It is important to note that the diameter of the opening 58 defined by the ridge 56 on the cover 36 is greater than the diameter of the opening of the sealing portion 40, which is defined by the lips 48, 50 and 52. The opening 58 must be of sufficient size to receive the splined portion 26 of the shaft 24. The sealing portion 40 of the seal 34 must be resilient because it has to be able to stretch over the splined portion 26 during assembly but sealingly engage the outer surface of the smaller neck portion 28. Accordingly, the opening 58 is of larger diameter than splined tooth portion 26.

The cover 36 preferably is snapped over the seal 34. The seal 34 preferably includes a groove 62 that is annular and extends around the outer circumference of the seal 34. The cover 36 includes a plurality of tabs 64, which include radially inwardly project tabs that abuttingly engage one edge within the groove 62. At least three tabs 64 preferably are provided. Alternatively, a plurality of circumferentially spaced notches may be provided in place of the single groove 62.

The placement of the cover 36 over the entire mounting portion 42 of the seal 34 and a substantial portion of the outer surface of the sealing portion 40 prevents the seal 34 from expanding, becoming dislodged or being deformed during use and, therefore, works to maintain the seal in proper engagement with the end 38 of the slip yoke 22. Further, the substantially rigid cover 36 protects the seal 34 from being damaged by contact with debris during operation.

The foregoing description is exemplary rather than limiting in nature. Skilled artisans will realize that various modifications to the disclosed embodiment are possible, however, such modifications do not necessarily depart from the purview and spirit of this invention. Accordingly, the appended claims must be studied to determine the proper legal scope of this invention.

What is claimed is:

1. A drive transmission, comprising:

a slip yoke having an inner peripheral longitudinal bore extending through a central portion of said yoke, a space being defined on an outer peripheral surface on said yoke near one end of said bore;

a shaft slidably received in said bore for axial movement relative to said yoke;

a seal on said yoke and adjacent said one end of said bore, said seal having a mounting portion received within said space on said yoke and a sealing portion for sealingly engaging a portion of said shaft, said sealing portion sealingly engaging a portion of said shaft; and a substantially rigid cover received over said mounting portion of said seal, said shaft extending through said seal and said cover, said cover is snapped over said seal.

2. The drive transmission of claim 1, wherein said seal includes first and second spaced lips.

3. The drive transmission of claim 2, wherein said first and second lips extend radially inward and axially away from each other.

4. The drive transmission of claim 3, wherein said yoke includes a chamfered portion adjacent said one end of said bore and wherein said first lip abuttingly engages said chamfered portion as said shaft moves axially relative to said yoke in one direction.

5. The drive transmission of claim 1, wherein said seal is made from a rubber material and said cover is made from a metal.

6. The drive transmission of claim 1, wherein said seal includes a space on an outer surface on said mounting portion and said cover includes a plurality of tabs that are received within said space to thereby prevent relative axial movement between said seal and said cover.

7. A drive transmission as recited in claim 1, wherein said cover extending beyond said mounting portion of said seal and said space and further onto said yoke, such that said cover being received over said seal on both axial sides of said space and said mounting portion.

8. A drive transmission comprising:

a slip yoke having an inner peripheral longitudinal bore extending through a central portion of said yoke, a space being defined on an outer peripheral surface on said yoke near one end of said bore;

a shaft slidably received in said bore for axial movement relative to said yoke;

a seal on said yoke and adjacent said one end of said bore, said seal having a mounting portion received within said space on said yoke and a sealing portion for sealingly engaging a portion of said shaft, said sealing portion sealingly engaging a portion of said shaft; and a substantially rigid cover received over said mounting portion of said seal, said shaft extending through said seal and said cover, said seal includes first and second spaced lips, said first and second lips extend radially inward and axially away from each other, a third lip is placed between said first and second lips.

9. A drive transmission comprising:

a slip yoke having an inner peripheral longitudinal bore extending through a central portion of said yoke, a space being defined on an outer peripheral surface on said yoke near one end of said bore;

a shaft slidably received in said bore for axial movement relative to said yoke;

a seal on said yoke and adjacent said one end of said bore, said seal having a mounting portion received within said space on said yoke and a sealing portion for sealingly engaging a portion of said shaft, said sealing portion sealingly engaging a portion of said shaft; and a substantially rigid cover received over said mounting portion of said seal, said shaft extending through said seal and said cover, said seal includes first, second and third spaced lips, said first and second lips extend radially inward and axially away from each other, said cover includes a ridge portion that extends generally radially inward and axially away from said slip yoke and conforms to a portion of said third lip such that said ridge portion provides axial support to said third lip when said shaft moves axially relative to said yoke in one direction.

10. The drive transmission of claim 9, wherein an opening defined by said ridge portion has a diameter that is greater than an opening defined by said sealing portion of said seal.

11. A sealing device for a drive transmission having a shaft that is slidably received within a slip yoke bore, comprising:

a seal being generally cylindrical and having a central bore extending along an axis, and adapted to be positioned adjacent an end of a slip yoke bore, and including a mounting portion at a first axial position, and a generally resilient sealing portion having first, second and third,lips for sealingly engaging a portion of a shaft, said first, second and third lips all having a relaxed inner diameter that is less than an outer diameter of said shaft such that said shaft deforms said first, second and third lips to provide said sealing engagement, said first, second and third lips being at a second axial position spaced from said first axial position, such that said mounting portion can be received in an outer peripheral mounting portion on a housing, and said first, second and third lips can extend axially from said mounting portion and then radially inwardly to contact a shaft; and a rigid cover is received over said seal.

12. The device of claim 11, wherein said seal is made of a rubber material and said cover is made of a metal.

13. The device of claim 12, wherein said seal includes a space on an outer surface on said mounting portion and wherein said cover includes a plurality of tabs that extend generally radially inward and abuttingly engage a surface of said space such that said cover and said seal are axially fixed relative to each other.

14. The device of claim 11, wherein said cover has a mounting portion with an opening of an inner diameter and said sealing portion has an inner diameter defined by said lips and wherein said mounting portion inner diameter is greater than said sealing portion inner diameter.

15. The device of claim 11, wherein said first and second lips extend generally radially inward and in generally opposing axial directions and wherein said third lip is positioned axially between said first and second lips.

* * * * *